United States Patent Office 3,346,579
Patented Oct. 10, 1967

3,346,579
IODINE CHLORIDE COMPLEXES OF QUINOLINE AND ACRIDINE COMPOUNDS
John T. Sheehan, Middlesex, and Jack Bernstein, New Brunswick, N.J., assignors to E. R. Squibb & Sons Inc., New York, N.Y., a corporation of Delaware
No Drawing. Filed Apr. 25, 1966, Ser. No. 544,856
3 Claims. (Cl. 260—279)

Many compounds which show antimalarial activity against various malarial parasites of the genus Plasmodium suffer from their inherent toxicity. See, for example, Merck Index (7th edition, 1960), page 885. Since the compound must be administered for long periods of time, this toxicity is of great importance. We have unexpectedly discovered that certain antimalarial agents will form complexes with iodine monochloride. These complexes are not only less toxic than the parent antimalarial compound itself, but most unexpectedly are more active than the parent compound. It is therefore an object of this invention to provide a method for reducing the toxicity of antimalarial agents and for producing new antimalarial agents of low toxicity.

The toxicity of the antimalarial agent may be reduced by reacting the compound with iodine monochloride to form the iodine chloride complex. The antimalarial compound may be in the form of the free compound or, preferably, an acid salt of that compound.

Antimalarial agents to which this invention is particularly adapted may be described by the general structural formula

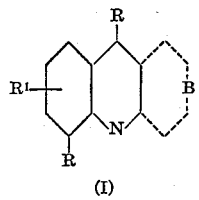

(I)

In Formula I, one R represents hydrogen and the other represents a basic group of the following structure:

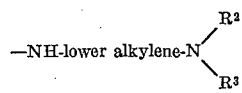

The lower alkylene groups are straight or branched aliphatic chains of less than eight carbon atoms, $R^2$ and $R^3$ are hydrogen, lower alkyl or hydroxy-lower alkyl. $R^1$ is hydrogen, halogen, trifluoromethyl or lower alkoxy.

The compounds depicted by Formula I have either the two ring nucleus of quinoline or the three ring nucleus of acridine so that, when present, the symbol B represents the four carbon atoms which complete an aromatic ring which bears a substituent $R^1$.

In other words, the two ring systems included in Formula I are

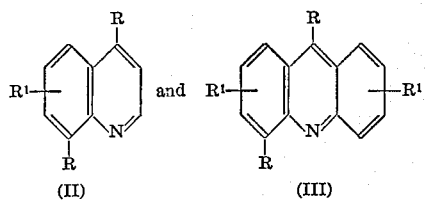

(II)            (III)

The alkyl chains in all of the above groups may be straight or branched. Chlorine and bromine are the preferred of the four halogens.

Compounds of the foregoing formulas include, for example, quinacrine, chloroquine, hydroxychloroquine, pamaquine, pentaquine, isopentaquine, primaquine, and the like.

According to this invention, the antimalarial agent, preferably an antimalarial compound of the quinoline or acridine series formulated above, either in the free base or as an acid salt thereof, e.g., hydrochloride, sulfate, phosphate or the like, is reacted with iodine monochloride. This is effected in an organic solvent such as acetic acid, propionic acid, N,N-dimethylformamide, N,N-dimethylacetamide, or the like, preferably with heating. The iodine chloride complex of the compound of the quinoline or acridine series forms as a result of this reaction and this complex may be isolated by filtration due to its insolubility in the reaction solvent, or by removal of the solvent by distillation under reduced pressure.

The method of producing the iodine monochloride complexes of this invention is illustrated by the following examples.

*Example 1.*—*2 - methoxy-6-chloro-9-(1-methyl-4-diethylaminobutylamino)acridine, hydrochloride, iodine chloride complex*

A solution of 20 g. of iodine monochloride in 15 ml. glacial acetic acid is added with stirring and heating to a solution of 25 g. (0.05 M) of 2-methoxy-6-chloro-9-(1-methyl-4-diethylamino-butylamino)acridine, dihydrochloride, in 500 ml. glacial acetic acid over a period of ½-hour. The resulting dark brown mixture is heated on a steam bath with stirring for 2 hours. The mixture is cooled and supernatant acetic acid decanted from the bottom oily layer. This oil is dissolved in 500 ml. absolute alcohol. A small amount of insoluble material is removed by decantation of the alcohol. To the alcohol solution is added about 2 l. of anhydrous ether. A yellow gummy precipitate is formed which granulates on standing. The solid is filtered, washed with ether and dried to yield to 26 g. product melting at 171–173°. After recrystallization from 3,400 ml. absolute alcohol, the product weighs 13 g. and melts at 171–173°.

*Example 2.*—*7 - chloro-4-(1-methyl-4-diethylaminobutylamino)quinoline, hydrochloride, iodine chloride complex*

Following the procedure of Example 1 but substituting 19.5 g. of 7 - chloro-4-(1-methyl-4-diethylaminobutylamino)quinoline dihydrochloride, for the 2-methoxy-6-chloro - 9-(1-methyl-4-diethylaminobutylamino)acridine, dihydrochloride, there is obtained the iodine chloride complex of 7 - chloro-4-(1-methyl-4-diethylaminobutylamino)quinoline hydrochloride.

*Example 3.*—*8 - (4 - diethylamino-1-methylbutylamino)-6-methoxyquinoline, hydrochloride, iodine chloride complex*

Following the procedure of Example 1 but substituting an equivalent amount of 8-(4-diethylamino-1-methylbutylamino)-6-methoxyquinoline hydrochloride for the 2-methoxy - 6 - chloro-9-(1-methyl-4-diethylaminobutylamino)acridine dihydrochloride, there is obtained the iodine chloride complex of 8-(4-diethylamino-1-methylbutylamino)-6-methoxyquinoline hydrochloride.

Using a similar procedure but substituting the appropriate starting material for the 2-methoxy-6-chloro-9-(1-methyl - 4-diethylaminobutylamino)acridine dihydrochloride, there is obtained the iodine chloride complexes of the following compounds: 8-(4-amino-1-methylbutylamino) - 6 - methoxyquinoline, 7-chloro-4[4-[ethyl-(2-hydroxylethyl)amino]-1-methylbutylamino]quinoline and 8-(5-isopropylaminoamylamino)-6-methoxyquinoline.

In animal tests, 2-methoxy-6-chloro-9-(1-methyl-4-diethylaminobutylamino)acridine dihydrochloride (quinacrine dihydrochloride) was compared with the iodine chloride complex of Example 1. The tests consist of infecting mice with a lethal dose of *Plasmodium berghei* three days prior to administration of the test compound at each dose level. Routinely, the compounds are administered subcutaneously in vegetable oil.

The mean survival time of infected control mice is 7.0±0.5 days. An extension of survival time is an indication of antimalarial activity. Any mice surviving 30 days after infection are reported as being cured.

The following test results have been obtained:

| QUINACRINE DIHYDROCHLORIDE | | |
|---|---|---|
| Dose | Mean Survival Time/Control | Extension of Survival Time |
| 640 mg./kg. | 4.0/7.0 | Toxic |
| 160 mg./kg. | 16.4/7.0 | +9.4 |
| QUINACRINE HYDROCHLORIDE IODINE CHLORIDE COMPLEX | | |
| Dose | Mean Survival Time/Control | Extension of Survival Time |
| 640 mg./kg. | [1] 30 | 5 out of 5 cures |
| 160 mg./kg. | [1] 30 | 4 out of 5 cures |

[1] The mean survival time cannot be calculated since more than half the mice were alive on the 30th day, the last day of the test.

These data indicate that the iodine chloride complex is less toxic than quinacrine since the latter kills the mice at 640 mg./kg. while the former does not. The former is also more active since 5 out of 5 cures are effected at 640 mg./kg. and 4 out of 5 cures at 160 mg./kg. The survival time is greater than 30 days for the iodine chloride complex whereas quinacrine does not cure any of the animals at either dose and the mean survival time at 160 mg./kg. is only 16.4 days.

What is claimed is:
1. The iodine chloride complex of a quinoline or acridine compound having the formula

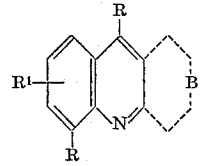

and acid salts thereof, wherein $R^1$ is hydrogen, halogen, trifluoromethyl or lower alkoxy, one R is hydrogen and the other R is a basic group of the formula

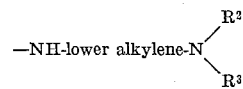

$R^2$ and $R^3$ are hydrogen, lower alkyl or hydroxy-lower alkyl, and in the acridine compounds, B is the residue of an aromatic ring.

2. The iodine chloride complex of a quinoline of claim 1 wherein R in the heterocyclic ring is 1-methyl-4-diethylaminobutylamino and R in the aromatic ring is hydrogen, and $R^1$ is 7-chloro.

3. The iodine chloride complex of an acridine of claim 1 wherein R in the heterocyclic ring is 1-methyl-4-diethylaminobutylamino and R in the aromatic ring is hydrogen, $R^1$ is 6-chloro and B is 2-methoxyphenyl.

References Cited

Labes et al., J. Chem. Phys., vol. 33, pages 868–872 (1960).

ALEX MAZEL, *Primary Examiner.*

D. G. DAUS, *Assistant Examiner.*